United States Patent [19]

Koehler et al.

[11] 4,299,628

[45] Nov. 10, 1981

[54] METAL POWDER COMPOSITION AND ARTICLE MADE THEREFROM

[75] Inventors: Michael Koehler, Wetter; Wolfgang Petry, Bochum, both of Fed. Rep. of Germany

[73] Assignee: Bleistahl G.m.b.H., Wetter, Fed. Rep. of Germany

[21] Appl. No.: 189,142

[22] Filed: Sep. 22, 1980

Related U.S. Application Data

[62] Division of Ser. No. 49,763, Jun. 18, 1979, Pat. No. 4,251,274.

[30] Foreign Application Priority Data

Jun. 29, 1978 [DE] Fed. Rep. of Germany ....... 2828513

[51] Int. Cl.$^3$ ................................................. B22F 5/00
[52] U.S. Cl. ......................................... 75/230; 75/201
[58] Field of Search .................................. 75/201, 230

[56] References Cited

U.S. PATENT DOCUMENTS

| | | | |
|---|---|---|---|
| 3,891,399 | 6/1975 | Cadle | 75/201 |
| 3,893,848 | 7/1975 | Motoyoshi et al. | 75/122 |

*Primary Examiner*—Brooks H. Hunt
*Attorney, Agent, or Firm*—Thomas H. Murray; Clifford A. Poff

[57] ABSTRACT

A composition for compressing and sintering to produce high-wear resistant articles essentially includes between 2% and 10% by weight, preferably 5% by weight, basalt powder and the remainder being metallurgical powder. The metallurgical powder is preferably comprised of austenite steel powder of high commercial quality and the basalt powder is a commercial quality basalt. The article of manufacture is for an internal combustion engine supplied with lead-free fuel wherein the article is comprised of compressed and sintered metal powder having the entire resulting pore space filled with basalt. The article takes the form of a cylinder liner, a valve seat and/or a valve-seat ring.

4 Claims, No Drawings

METAL POWDER COMPOSITION AND ARTICLE MADE THEREFROM

This is a division of application Ser. No. 049,763, filed June 18, 1979, now U.S. Pat. No. 4,251,274.

BACKGROUND OF THE INVENTION

This invention relates to a metallurgical powder composition and a high-wear resistant article made therefrom including a cylinder liner and a valve-seat ring wherein the metallurgical powder composition is compressed and sintered after admixture with basalt powder and, if desired, admixture with carbon, lead and/or other heavy metals.

In West German Patent Specification No. 1,121,089 there is disclosed a lubricant for cylinder liners and valve-seat rings made of sintered iron containing carbon and lead. The articles are made by briquetting, sintering and subsequent hot or cold compression. The sintered iron contains, before treatment, 0.6–0.9% carbon, 3–4% lead, 1.5–3% nickel and copper, with the remainder being iron having conventional impurities.

In some applications, for example, in the production of valve-seat rings for the exhaust valves of motor vehicles, it is necessary that the material of the article provides a high-heat resistant property in addition to requisite strength properties. U.S. Pat. No. 3,471,343 discloses valve-seat rings having increased resistance to heating for exhaust valves of motor vehicles. The valve-seat rings are manufactured by compressing, sintering and subsequently compacting a powder mixture containing 0.8–1.5% graphite, 1.0–4% lead, 0.5–5% nickel, 1.2–1.8% molybdenum and 9.6–14.4% cobalt, with the remainder being iron. It is also known in the powder metallurgical art to produce valve-seat rings having a high resistance to heat by a method using metal powder containing iron, 0.5–1% carbon, 0.7–1.5% lead, 1.0–2% nickel, cobalt and 1.0–2% molybdenum. In the method, 0.5–1% carbon and 0.7–1.5% lead are added to a pulverized prealloyed metal containing 1.0–2% nickel, 6.0–7% cobalt and 1.0–2% molybdenum, the remainder being iron and conventional impurities in steel. The mixture is then briquetted, sintered and compacted when hot or cold and heat-treated if required. The addition of lead in the aforementioned material composition improves the operational characteristics of the valve-seat ring. The lead functions as a lubricant.

West German Patent Specification No. 2,155,765 discloses a valve-seat material for an internal combustion engine wherein the material is comprised of a matrix made up of an iron-based alloy containing a dispersed constituent of lead, a lead compound or glass. For example, the valve-seat material can have a matrix comprised of an iron-based alloy in which 0.5–30% by weight chromium, 0.1–3% by weight carbon, 0.3–10% by weight lead and up to 10% by weight glass are dispersed. As before, lead and low-melting point silicate glass are added to improve the lubricating properties of the valve-seat material. The lead and glass constituents in the valve-seat material flow onto the sliding surface of the valve seat where they function as a lubricant.

SUMMARY OF THE INVENTION

It is an object of the present invention to provide a composition for use in powder metallurgy for the manufacture of articles having increased wear-resistance where the composition is particularly useful to impart such properties to valve seats seat rings and cylinder liners for internal combustion engines supplied with lead-free fuel and wherein the starting mixture is a metal powder to which carbon, lead and/or other heavy metals are added if required.

More particularly, it is a further object of the present invention to provide a powder composition for compressing and sintering to produce a high-wear resistant article wherein the powder composition essentially includes between 2% and 10% by weight basalt powder and the remainder metallurgical powder.

According to a further feature of the present invention, the powder composition is particularly suitable for the manufacture of valve-seat rings having high resistance to wear when used in an internal combustion engine supplied with lead-free fuel wherein the mixture is made up of austenite high-quality steel powder containing 5% by weight basalt. The basalt powder used according to the present invention is preferably commercial basalt.

Surprisingly, it has been discovered that articles made from the metallurgical powder composition according to the present invention have increased wear-resistance and strength by compressing and sintering the metallurgical powder mixture. It is believed that the surprising result is brought about because the entire pore space of the novel article is filled by adding basalt so that the heretofore conventional step of subsequent compacting of sintered articles becomes impossible and, therefore, superfluous.

According to the present invention, it has been found desirable to add a low-melting point constituent material to impart lubricating properties to the article. In the past, the addition of such material has caused difficulties in some cases. Even though the occurrence of the basalt in the pores of the article does not provide a lubricant property, due to the high-melting point of the basalt, it has been found that the basalt-filled pores substantially prevents metal grating onto metal. This is particularly useful and occurs, for example, when the material is used to form a valve seat.

EXAMPLE

Commercial, high-quality steel powder, Type 316 L, was mixed with 5% by weight basalt powder having the following composition:
- 44.8% $SiO_2$
- 21.9% $Al_2O_3$
- 10.5% $Fe_2O_3$
- 11.2% CaO
- 5.0% MgO
- Remainder: trace elements.

The mixture was compressed to form rings at a pressure of 50 $KN/cm^2$. The diameters of the rings were 33 mm and 40 mm and the height of the ring was 9.5 mm. The compressed rings were then sintered at 1100° C.–1200° C. for 2 hours. The rings were not compacted after sintering. The final machining was conventional and restricted to calibration, turning and grinding.

The resulting ring had a matrix having the following composition:

| Carbon | Silicon | Chromium | Nickel | Molybdenum |
|--------|---------|----------|--------|------------|
| <0.2   | <2.0    | 15–17    | 10–13  | 1–3        |

The pore space was filled with about 15% by volume basalt.

The rings were used as valve-seat rings for longterm testing in Otto engines, driven with lead-free fuel. The wear, measured as valve-clearance, was less than 0.10 mm after 200 hours of operation.

Although the invention has been shown in connection with a certain specific embodiment, it will be readily apparent to those skilled in the art that various changes in form and arrangement of parts may be made to suit requirements without departing from the spirit and scope of the invention.

We claim:
1. An article of manufacture in powder metallurgy for an internal combustion engine supplied with lead-free fuel, said article being comprised of a compressed and sintered metal powder having the entire pore space filled with basalt.
2. The article of manufacture according to claim 1 wherein said article includes a cylinder liner.
3. The article of manufacture according to claim 1 wherein said article includes a valve seat.
4. The article of manufacture according to claim 1 wherein said article includes a valve-seat ring.

* * * * *